(12) United States Patent
Rajagopal et al.

(10) Patent No.: US 7,380,049 B2
(45) Date of Patent: May 27, 2008

(54) MEMORY PROTECTION WITHIN A VIRTUAL PARTITION

(75) Inventors: Priya Rajagopal, Hillsboro, OR (US); Carlos Rozas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 273 days.

(21) Appl. No.: 11/219,905

(22) Filed: Sep. 6, 2005

(65) Prior Publication Data

US 2007/0055837 A1   Mar. 8, 2007

(51) Int. Cl.
*G06F 12/00* (2006.01)
*G06F 13/00* (2006.01)
*G06F 13/28* (2006.01)
*G06F 9/455* (2006.01)

(52) U.S. Cl. .............................. 711/6; 711/1; 711/163; 711/164; 711/165; 718/1

(58) Field of Classification Search ................ None
See application file for complete search history.

(56) References Cited

U.S. PATENT DOCUMENTS

| 6,928,548 | B1* | 8/2005 | Hale et al. ............... 713/187 |
| 2004/0064718 | A1* | 4/2004 | Harrington et al. ......... 713/200 |
| 2005/0132122 | A1 | 6/2005 | Rozas |
| 2006/0179177 | A1* | 8/2006 | Arndt et al. ............... 710/22 |
| 2007/0043896 | A1 | 2/2007 | Daruwala et al. |

OTHER PUBLICATIONS

Zezschwitz, G.,Device Drivers Concluded, 1996,Linux Journal, 12 pages.*
US Patent Application to Burzin Daruwala et al., pending, filed Aug. 17, 2005, Serial No. TBD.

* cited by examiner

*Primary Examiner*—Hyung S. Sough
*Assistant Examiner*—Gary W Cygiel
(74) *Attorney, Agent, or Firm*—Thomas R. Lane

(57) ABSTRACT

The present disclosure relates to attempting to monitor and control memory access and, more specifically, to attempting to limit memory access to a specific registered software agent.

13 Claims, 2 Drawing Sheets

MEMORY PROTECTION WITHIN A VIRTUAL PARTITION

BACKGROUND

1. Field

The present disclosure relates to attempting to monitor and control memory access and, more specifically, to attempting to limit memory access to a specific registered software agent.

2. Background Information

A typical computer or processing system is controlled by an operating system that allows the execution of various programs. A kernel or kernel mode program is often referred to as the core of an operating system; the portion of the system that manages memory, files, and peripheral devices; maintains the time and date; launches applications; and allocates system resources. In this context a "computer" refers to any device with a processing unit and is a term not limited to the traditional PC or laptop.

It is typically desirable that kernel level software, the state of the software, and software's configuration information be protected from unintended alteration or access. With the increase is sophistication of computer worms, viruses, and other malware and the complexity of monolithic operating systems (e.g. Windows and Linux) this protection has become increasingly difficult.

Typically used memory protection schemes enforce course-grain access control. These schemes often control memory access based upon a privilege level assigned to the accessing software. Typically, programs are assigned one of only two possible privilege levels. These two privilege levels may often be referred to as kernel mode and application/user mode. These schemes do not offer any protection against memory access from other software running within the same privilege level in the monolithic operating system.

This implies that on a typical system, a kernel mode program is typically allowed unbounded access to all memory pages on the system. The kernel mode program may intentionally or accidentally corrupt data or reconfigure other programs, possibly to execute malicious code Furthermore, standard processor protection mechanisms are often operating system enforced. As such, these protection mechanisms may be overridden by malicious code that has kernel level privileges. For example, a malicious kernel level program can change the memory page table protection bits corresponding to a valid driver to allow tampering. A need therefore exists, to detect and control access to memory.

BRIEF DESCRIPTION OF THE DRAWINGS

Subject matter is particularly pointed out and distinctly claimed in the concluding portions of the specification. The claimed subject matter, however, both as to organization and the method of operation, together with objects, features and advantages thereof, may be best understood by a reference to the following detailed description when read with the accompanying drawings in which:

DETAILED DESCRIPTION

In the following detailed description, numerous details are set forth in order to provide a thorough understanding of the present claimed subject matter. However, it will be understood by those skilled in the art that the claimed subject matter may be practiced without these specific details. In other instances, well-known methods, procedures, components, and circuits have not been described in detail so as to not obscure the claimed subject matter.

The virtualization of machine resources has been of significant interest for some time; however, with processors becoming more diverse and complex, such as processors that are deeply pipelined/super pipelined, hyper-threaded, on-chip multi-processing capable, and processors having Explicitly Parallel Instruction Computing (EPIC) architecture, and with larger instruction and data caches, virtualization of machine resources is becoming an even greater interest.

Many attempts have been made to make virtualization more efficient. For example, some vendors offer software products that have a virtual machine system that permits a machine to be virtualized, such that the underlying hardware resources of the machine appears as one or more independently operating virtual machines (VM). Typically, a Virtual Machine Monitor (VMM) may be a thin layer of software running on a computer responsible for creating, configuring, and managing VMs. It may also be responsible for providing isolation between the VMs. In one embodiment, the VMM may be an application running within a host operating system. In one specific embodiment, the VMM may include 3 main portions: a kernel mode application or set of applications running on the host operating system, a set of drivers in the host operating system, and a co-operative kernel that substantially or partially replaces the host kernel when the VM is running. In an alternate embodiment, the VMM may be a layer of basic code executing directly on the host hardware. Each VM, on the other hand, may function as a self-contained platform, running its own operating system (OS), or a copy of the OS, and/or a software application. Software executing within a VM is collectively referred to as "guest software" or "guest OS". Some commercial solutions that provide software VMs include VMware, Inc. (VMware) of Palo Alto, Calif. and VirtualPC by Microsoft Corp. of Redmond, Wash.

Figure 1:
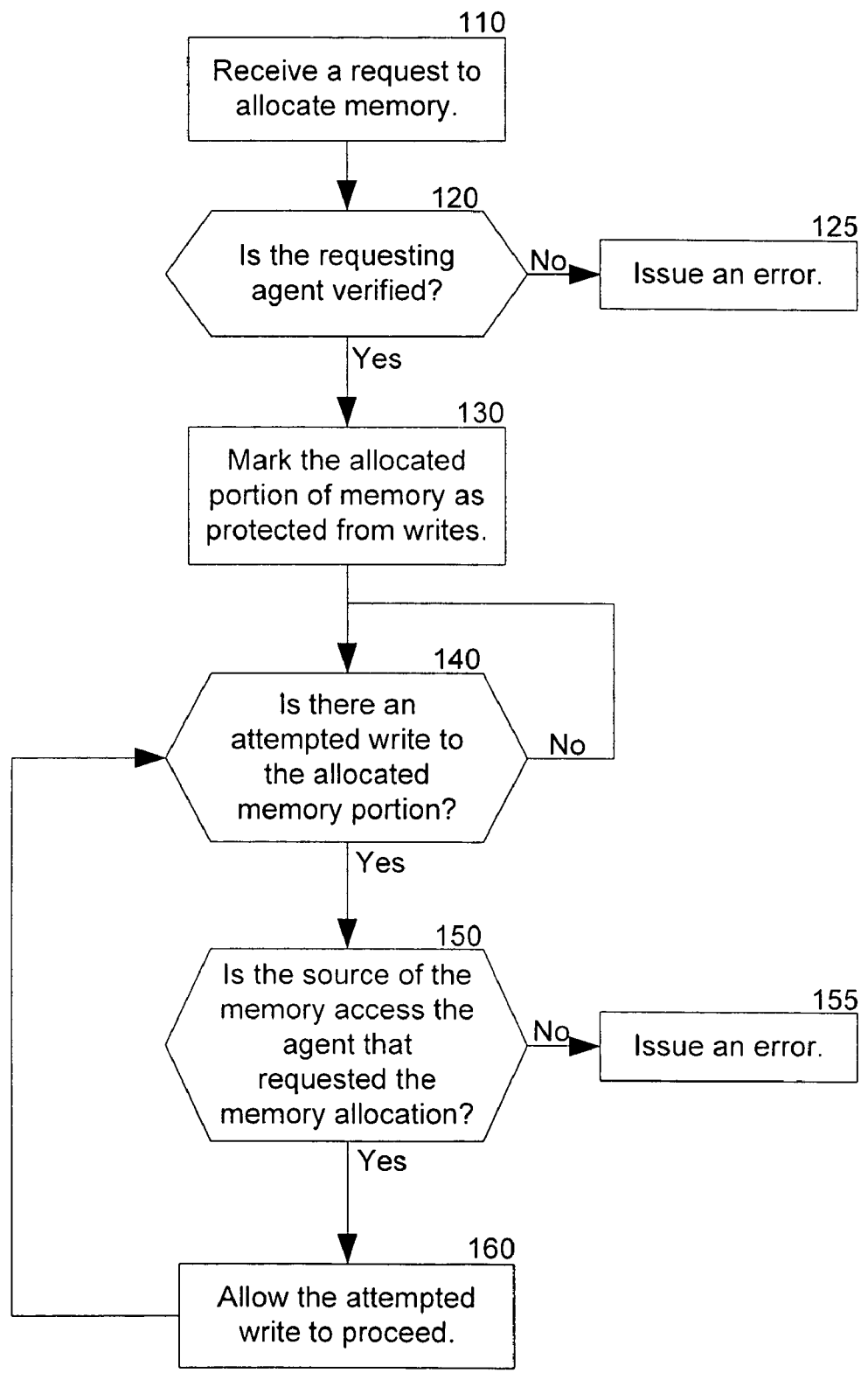
FIG. 1 is a flow chart illustrating an embodiment of a memory management technique in accordance with the disclosed subject matter.

FIG. 1 is a flow chart illustrating an embodiment of a memory management technique in accordance with the disclosed subject matter. Block 110 illustrates that a request to allocate memory may be received. In one specific embodiment, a software application, or software agent, may be executing within a virtual machine (VM). The software application may invoke a memory allocation request as part of loading and initializing or as part of performing its normal functions. The software application may be one of many possible software applications, such as for example, a device driver, security software, a user-level application, a sub-module of a larger application, etc. These, of course, are a few non-limiting examples of possible software agents.

In one embodiment, the allocation request may be received by a Virtual Machine Monitor (VMM). In one embodiment, the VMM may be a privileged piece of software, firmware, or combination thereof, that is responsible for creating, configuring, and managing a number of VMs. It may, in one embodiment, have complete access to the whole of system memory, and some or all system resources. The VMM may be responsible for controlling and monitoring access from the VMs to these resources.

In one embodiment, the memory allocation request to the VMM may be a technique used for allocating any memory or, in another embodiment, an alternate technique that may be used when additional memory protection is desired. In one embodiment, the memory allocation may be aided by a hardware component, such as, for example, a Virtual Machine Control Structure (VMCS). In one embodiment, the memory may be allocated statically to the guest VM when the VM is created or instantiated. In another embodiment, the memory allocation may occur dynamically. In one specific embodiment, a VMCS may include a hardware, software, firmware, or combination thereof structure which stores platform state information when the system transitions form the VM to the VMM, or vice versa. In some embodiments, the VMCS may be used by the VMM to configure conditions that will cause the VM to "exit," or transfer or control to the VMM.

Block 120 illustrates that in one embodiment, the requesting software agent or application may be verified before a memory allocation is attempted. In one embodiment, the VMM or other verifying agent may compare the software application's code image versus a known golden image. In one embodiment, this may involve utilizing a hash of the application's code. In another embodiment, a pass code or key may be used to authorize and verify the application.

Block 125 illustrates that, in one embodiment, if the requesting software agent is not verified, an error or other response may be issued. In one embodiment, the request for memory allocation may fail.

Block 130 illustrates that, in one embodiment, the requested memory allocation may be allowed and the allocated portion of memory may be marked as write protected. In this context, write protection includes protecting the memory portion from write access. In one embodiment, this may include marking the memory portion as read-only. In another embodiment, the memory portion may be marked as requiring authorization before a write may be preformed. In yet another embodiment, the memory portion may be marked as only being writeable if a certain memory call is made. It is understood that other write protection schemes are within the scope of the disclosed subject matter. In one embodiment, the memory portion may be read-protected or both read and write protected. It is understood that any discussion of memory writes is also applicable to embodiments dealing with memory reads.

In one embodiment, the memory portion may be at the process page level of granularity. In another embodiment, the protected memory portions may by the individual memory addresses. In yet another embodiment, the memory portion may be related to the physical memory module used. It is understood that levels of memory granularity and correlation may be used and are within the scope of the disclosed subject matter.

In one embodiment, the protection of the memory portion may involve a multiple part scheme. In a specific embodiment, the guest VM may be configured to generate an error or alert if the allocated memory portion is accessed in a suspect way and the VMM may be configured to handle any such alert. In one specific embodiment, the processor or processor data structures may be configured generate an error or alert if the allocated memory portion is accessed in a suspect way and the VMM may be configured to handle any such alert. In another embodiment, a hardware component, such as, for example, the chipset may be configured to generate an error or alter if the allocated memory portion is accessed.

It one specific embodiment, the VMM may configure the Process Page Tables, if the embodiment includes a memory portion at a page level of granularity, to generate a page fault when a write is attempted to the protected memory portion. In another embodiment, this may be accomplished by marking the page that includes the memory portion as write protected or read-only.

In one specific embodiment, the VMM may maintain a registered source list that correlates registered or verified software agents with particular memory portions. In a specific embodiment, this may map a code image to a bitmap of protected memory portions. In one version of the specific embodiment, one bit may be associated with a specific memory portion. For example, this could be a bit for every protected page, in the case of an embodiment that uses page level granularity. This may allow the VMM to determine if a particular software application is authorized to access a particular memory portion.

In one embodiment, if the VMM is monitoring multiple VMs, each VM may need to be made aware that the allocated memory portion is protected. In another embodiment, each VM may be isolated and substantially unaware of each other. In one specific embodiment, each of the Process Page Tables for each VM, if the embodiment includes a memory portion at a page level of granularity, may be configured to generate a page fault when a write is attempted to the memory portion.

In yet another specific embodiment, the VMM may reconfigure a hardware table that correlates physical memory with memory protection to allow memory access. The VMM may mark the portion of memory as protected. In one specific embodiment, the hardware table may be capable of denoting that physical memory portions are protected in various ways from memory access. In one embodiment, the hardware table may denote that certain memory portions are protected from writes, reads, or a combination thereof. In a further embodiment, the hardware table may further denote that certain memory portions may not be accessed via a Direct Memory Access (DMA). In one embodiment, the hardware table may denote the level of protection for each memory portion in the table using a 2-bit field. A first bit denoting DMA protection and a second denoting Write/Read protection. In one embodiment, if a write or other protected memory operation is attempted from the host system to the portion of physical memory marked as protected, a fault may be generated to the VMM. In one embodiment, the VMM may handle the hardware fault in a manner similar to the page fault case described above and below.

Block 140 illustrates that, in one embodiment, an attempted write may occur to the allocated memory portion. In another embodiment, if the memory portion was also or alternatively protected from reads, Block 140 may illustrate that a read has been attempted.

In one specific embodiment, the attempt to write to the protected portion of memory may generate a fault. Specifically, in one embodiment, if the level of memory protection is at the page granularity level, a page fault may be generated. In one specific embodiment, if the Process Page Table of the VM was marked as read-only, an attempt to read from the page may generate a page fault, and control may be transferred to the VMM.

Block 150 illustrates that, in one embodiment, an attempt may be made to verify that the software agent that is attempting to write (or read) to the allocated memory portion is authorized to do so. In one embodiment, the VMM may determine if the software agent is authorized to access the memory portion by utilizing a table that correlates software agents with memory portions that the agents are authorized to access.

In one specific embodiment, the VMM may maintain a Registered Source List (RSL) that correlates code images with memory portions. The VMM may receive a page (or other memory) fault that indicates that a memory portion has been accessed and the identity of the software agent attempting to access the memory portion. In one embodiment, the identity of the source agent may be derived by receiving the source address of the faulting instruction and correlating that source address with a software agent. In a further embodiment, each time a memory access causes a transition into the VMM, the address of the instruction causing the transition may be derived from the VMCS or substantially equivalent structure. Utilizing this information, the VMM may confirm that the software agent is registered within the RSL. In some embodiments, the RSL may include software agents and memory portions from multiple VMs. In various embodiments, the RSL may include a one-to-one, one-to-many, many-to-one, or many-to-many mapping of code images to memory portions.

Block 155 illustrates that, in one embodiment, if the verification fails an error or other alert may be generated. In one specific embodiment, where the VMM received a page (or other memory) fault, the VMM may return the fault to the VM and allow the VM to process the fault.

Block 160 illustrates that, in one embodiment, if the memory access is authorized, the attempted write may be allowed to proceed. In another embodiment, if the memory access is a read and reads are protected, Block 160 illustrates that the read operation may proceed. It is understood that any discussion of memory writes is also applicable to embodiments dealing with memory reads.

In one specific embodiment, if the memory access is authorized, the VMM or other monitoring agent may complete on the behalf of the software agent the memory access by emulating the memory access. For example, if a page fault was received by the VMM from the VM, the VMM may itself perform the requested write to the memory. It is understood that if multiple VMs are in use, the VMM may update any cached memory in the various VM s to reflect the alteration.

In another specific embodiment, the VMM may re-configure the process page tables (if the memory portion is on the page level granularity) of the VM to allow memory writes. The authorized software agent may then attempt a second write to the memory portion. Since, the memory portion is no longer marked as protected, this write is expected to be successful unlike the first write, described in Block 140. It is understood that if multiple VMs are in operation, the VMM may modify the process page tables across multiple VMs, or only the authorized VM.

In a further specific embodiment, the VMM may configure the VM to trap to the VMM if there is a context switch or change in the active page table. This may prevent context switches that can cause an unauthorized software agent to assume control in between the time the authorized software has first attempted to write to the memory portion (Block 140) and the time when the authorized software attempts a second write to the memory portion. Upon a context switch, the VMM may reconfigure the VM's page process table to write protect the memory portion. In a specific embodiment, the VMCS may be configured to transfer control to the VMM on a context switch. In another embodiment, the VMM may merely be notified in the case of a context switch. It is understood that if multiple VMs are in operation, the VMM may prevent context switches across the multiple VMs, or just the authorized VM.

In yet another specific embodiment, the VMM may reconfigure a hardware table that correlates physical memory with memory protection to allow memory access. The authorized software agent may then attempt a second write to the memory portion. Since, the memory portion is no longer marked as protected, this write is expected to be successful unlike the first write, described in Block 140. Again, the VMM may take appropriate action to protect against context switches within the VM or among VMs.

In yet one more specific embodiment, the VMM may configure the VM process page tables (if the memory portion is on the page level granularity) to include only references to authorized code and memory portions. If an attempt was made to execute any unauthorized software agent, the code containing the unauthorized software would not be found in the revised page tables and a fault would be generated. Upon competition of the authorized memory write, the previous full process page table would be restored.

Figure 2:
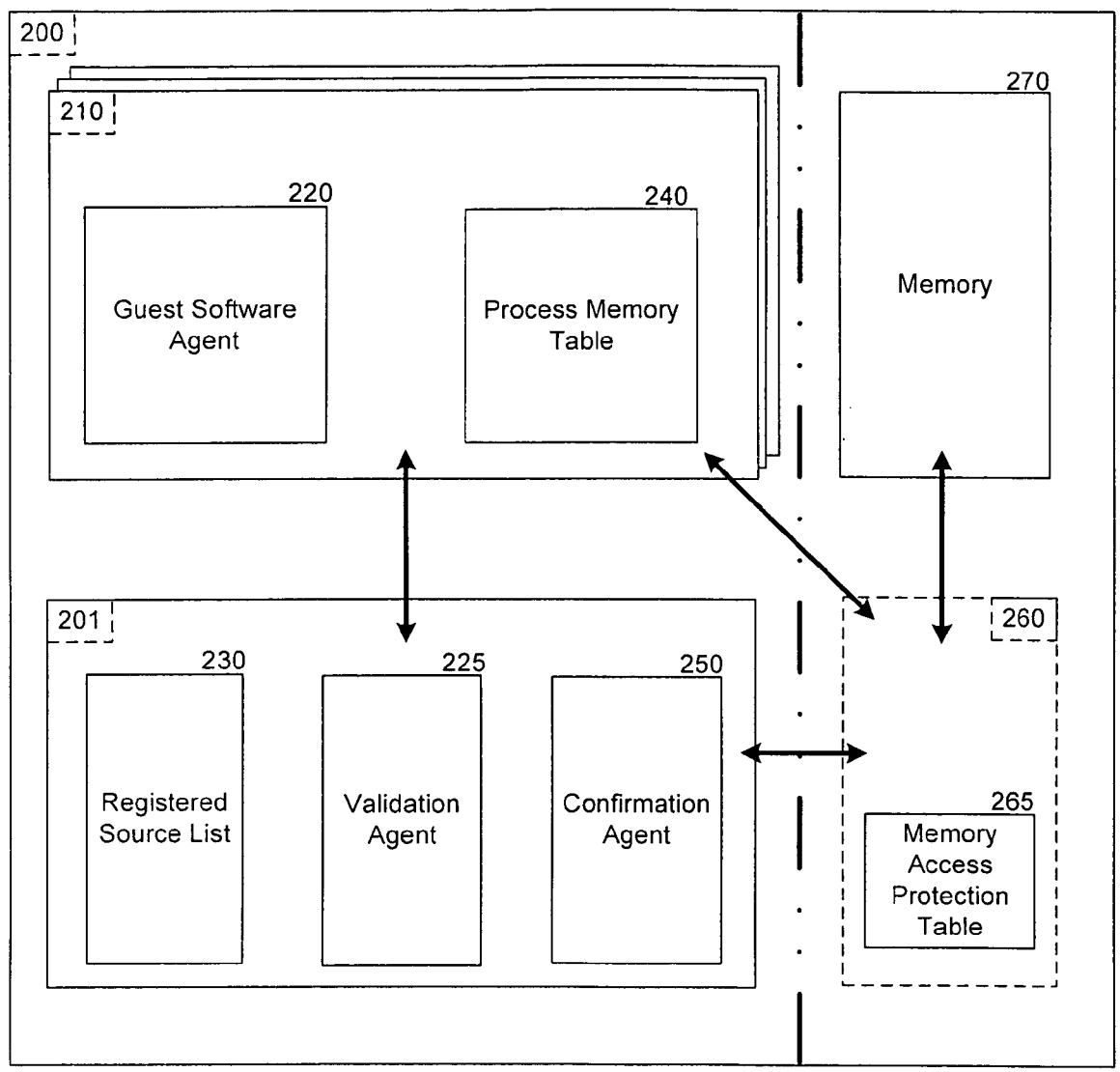
FIG. 2 is a block diagram illustrating an embodiment of an apparatus and system in accordance with the disclosed subject matter.

FIG. 2 is a block diagram illustrating an embodiment of an apparatus 260 and system 200 in accordance with the disclosed subject matter. In one embodiment, the system may include a Virtual Machine Monitor (VMM) 201, a Virtual Machine (VM) 210, and memory 270, and a Memory Controller 260. It is understood that the system may include a plurality of Virtual Machines.

In one embodiment, the VM 210 may include a Guest Software Agent 220 and a Process memory Table 240. The Guest Software Agent may be capable of attempting to allocate and access specific memory portions. The Process Memory Table may be capable of correlating memory portions with various access and control flags. For example, in one specific embodiment, the Process Memory Table may control memory access at a Memory Page level. It is understood that other levels of granularity are within the scope of the disclosed subject matter.

In one embodiment, VMM 201 may include a Registered Source List 230 and a Confirmation Agent 250. In another embodiment, the VMM may also include a Validation Agent 225. The VMM may be capable of protecting and controlling access to memory portions. In one embodiment, the VMM may be capable of receiving a request to allocate memory from the Guest Software Agent 220, as described above in reference to Block 110 of FIG. 1. The VMM may also be capable of marking the allocated memory portion as protected from access, such as, for example memory reads and writes, as described above in reference to Block 130 of FIG. 1.

In one embodiment of the VMM 201, the Registered Source List may be capable of correlating code images or other code identifiers with authorized memory portions. The Confirmation Agent 250 may be capable of determining whether or not a Guest Software Agent 220 is permitted to access a memory portion. In one embodiment, the Confirmation Agent may be capable of performing the techniques described above in reference to Blocks 140, 150, 155, and 160 of FIG. 1.

In another embodiment, the VMM 201 may also include a Validation Agent 225. The Validation Agent may be capable of validating that the Guest Software Agent 220 is not corrupted and authorized to allocate memory portions, as described above in reference to Block 120 of FIG. 1. The Validation Agent, in one embodiment, may also be capable of altering and configuring the Register Source List 230. The Validation Agent may, in one embodiment, edit the Register Source List to correlate memory portions with authorized Guest Software Agents.

In one embodiment, Memory Controller 260 may be capable of providing access between the VMM 201 and VM(s) 210 and the physical memory 270. In one embodiment, the Memory Controller may be used to help the VMM perform the techniques described above in reference to Blocks 130, 140, 150 & 160 of FIG. 1.

In one embodiment, the Memory Controller may include a Memory Access Protection Table 265. The Memory Access Protection Table (MAPT) may be capable of denoting that physical memory portions are protected in various ways from memory access. In one embodiment, the MAPT may denote that certain memory portions are protected from writes, reads, or a combination thereof. In further one embodiment, the MAPT may further denote that certain memory portions may not be accessed via a Direct Memory Access (DMA). In one embodiment, the MAPT may denote the level of protection for each memory portion in the table using a 2-bit field. A first bit denoting DMA protection and a second denoting Write/Read protection. In one embodiment, the MAPT may be used to help the VMM perform the techniques described above in reference to Blocks 130, 140, 150 & 160 of FIG. 1.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact disk read only memory (CD-ROM), digital versatile disk (DVD), hard disk, firmware, non-volatile memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the claimed subject matter have been illustrated and described herein, many modifications, substitutions, changes, and equivalents will now occur to those skilled in the art. It is, therefore, to be understood that the appended claims are intended to cover all such modifications and changes that fall within the true spirit of the claimed subject matter.

The following is claimed:

1. A method for a virtual machine monitor that executes on a system to protect a memory portion comprising:
   receiving, by the virtual machine monitor, a request from a requesting agent, to allocate a memory portion;
   marking the allocate portion of memory as protected;
   receiving a notice that an inappropriate attempt has been made to access the allocated memory portion, wherein the source of the access is executing from within a virtual machine;
   preventing the inappropriate access;
   allowing the virtual machine monitor primary control of the system;
   determining if the source of the access is authorized to access the allocated memory portion; and
   if so, re-configuring the system to no longer generate a notice if the allocated memory portion is accessed in the way that generated the received notice;
   configuring the system to generate a fault if a context switch occurs within the virtual machine;
   allowing the source of the access to re-attempt the memory access; and
   upon either the completion of the access or a context switch within the virtual machine, configuring the system to generate a notice if the allocated memory portion is inappropriately accessed.

2. The method of claim 1, wherein marking the allocated portion of memory as protected includes:
   associating the requesting agent with the allocated memory portion; and
   configuring the system to generate a notice if the allocated memory portion is inappropriately accessed.

3. The method of claim 2, wherein associating the requesting agent with the allocated memory portion includes:
   verifying that the requesting agent is not compromised; and
   registering the requesting agent and the allocated memory portion with a registered source list.

4. The method of claim 2, wherein configuring the system to generate a notice if the allocated memory portion is inappropriately accessed includes:
   editing a Memory Access Protection Table to denote that the allocated memory portion is protected;
   wherein the Memory Access Protection Table is included as part of a hardware component of the system; and
   the Memory Access Protection Table is capable of facilitating the generation of a notice if a protected memory portion is inappropriately accessed.

5. The method of claim 2, wherein configuring the system to generate a notice if the allocated memory portion is inappropriately accessed includes:
   marking a memory page including the allocated memory portion as write-protected; and
   configuring a processor to generate a page fault if an attempt is made to write to the marked memory page.

6. The method of claim 1. wherein determining if the source of the access is authorized to access the memory portion includes:
   utilizing a registered source list that correlates code images with protected memory portions;
   determining if a code image related to the source of the access is in the registered source list; and
   if so, the related code image is allowed to access the accessed memory portion.

7. A system comprising:
a memory;
at least one virtual machine capable of executing a software agent; and
a virtual machine monitor capable of protecting portions of the memory, controlling access to the protected portions of the memory from the virtual machine, noticing that an inappropriate attempt has been made to access a protected memory portion, wherein the source of the access is executing from within the virtual machine, determining if the source of the access is authorized to access the protected memory portion, and if so, re-configuring the system to no longer generate a notice if the protected memory portion is accessed in the way that generated the received notice, configuring the system to generate a fault if a context switch occurs within the virtual machine, allowing the source of the access to re-attempt the memory access, and upon either the completion of the access or a context switch within the virtual machine, configuring the system to generate a notice if the protected memory portion is inappropriately accessed.

8. The system of claim 7, wherein the software agent is capable of requesting an allocation of memory; and
wherein the virtual machine monitor is capable of denoting the allocated portion of memory as protected.

9. The system of claim 8, wherein the virtual machine monitor is further capable of:
associating the software agent with the allocated memory portion; and
configuring the system to generate a notice if the allocated memory portion is inappropriately accessed.

10. The system of claim 9, wherein the virtual machine monitor is further capable of:
verifying that the software agent is not compromised;
registering the software agent and the allocated memory portion with a registered source list that denotes that the software agent is allowed to access the allocated memory portion.

11. The system of claim 9, further comprising a chipset having a Memory Access Protection Table (MAPT) capable of:
denoting that portions of memory are protected from various forms of access, and
capable of facilitating the generation of a notice if a protected memory portion is inappropriately accessed; and
wherein the Virtual Machine Monitor being capable of configuring the system to generate a notice if the allocated memory portion is inappropriately accessed includes:
editing the Memory Access Protection Table to denote that the allocated memory portion is protected.

12. The system of claim 9, further including a processor; and
wherein the Virtual Machine Monitor being capable of configuring the system to generate a notice if the allocated memory portion is inappropriately accessed includes:
marking a memory page including the allocated memory portion as write-protected; and
configuring the processor to generate a page fault if an attempt is made to write to the marked memory page.

13. The system of claim 7, wherein determining if the source of the access is authorized to access the memory portion includes:
utilizing a registered source list that correlates code images with protected memory portions;
determining if a code image related to the source of the access is in the registered source list; and
if so, the related code image is allowed to access the accessed memory portion.

* * * * *